United States Patent
Rivers, Jr. et al.

(10) Patent No.: US 7,062,388 B2
(45) Date of Patent: Jun. 13, 2006

(54) SERIES ARC DETECTION

(75) Inventors: Cecil Rivers, Jr., New Britain, CT (US); Adekunle Adeleye, Charlottesville, VA (US); Marcel Tardif, New Britain, CT (US)

(73) Assignee: General Electric Company, Schenectady, NY (US)

(*) Notice: Subject to any disclaimer, the term of this patent is extended or adjusted under 35 U.S.C. 154(b) by 131 days.

(21) Appl. No.: 10/708,686

(22) Filed: Mar. 18, 2004

(65) Prior Publication Data

US 2005/0207083 A1    Sep. 22, 2005

(51) Int. Cl.
*H01H 73/00* (2006.01)

(52) U.S. Cl. .................. 702/57; 702/76; 702/77; 702/58; 702/64; 361/115; 361/42; 324/536

(58) Field of Classification Search ............ 702/57–59, 702/64–66, 69, 71, 73, 76, 77, 124, 126, 702/115, 117, 189, 193; 361/42, 93.1, 93.2, 361/100.87, 78, 65, 115, 111, 2, 5, 10, 12, 361/14; 324/522, 512, 536, 509, 76.19, 76.2, 324/76.22, 76.79, 76.41, 520
See application file for complete search history.

(56) References Cited

U.S. PATENT DOCUMENTS

| | | | |
|---|---|---|---|
| 4,466,071 A | 8/1984 | Russell, Jr. ............... 364/492 |
| 4,510,611 A | 4/1985 | Dougherty .................... 375/8 |
| 5,561,605 A | 10/1996 | Zuercher et al. ........... 364/483 |
| 5,578,931 A * | 11/1996 | Russell et al. ............. 324/536 |
| 5,602,709 A | 2/1997 | Al-Dabbagh ................. 361/85 |
| 5,659,453 A | 8/1997 | Russell et al. ............... 361/93 |
| 5,726,577 A | 3/1998 | Engel et al. ................ 324/536 |
| 5,729,145 A | 3/1998 | Blades ....................... 324/536 |
| 5,818,671 A | 10/1998 | Seymour et al. .............. 361/42 |
| 6,002,561 A | 12/1999 | Dougherty .................... 361/42 |
| 6,128,169 A * | 10/2000 | Neiger et al. ................. 361/42 |
| 6,242,922 B1 | 6/2001 | Daum et al. ................ 324/520 |
| 6,255,923 B1 | 7/2001 | Mason, Jr. et al. .......... 335/18 |
| 6,504,692 B1 | 1/2003 | Macbeth et al. .............. 361/42 |
| 6,556,397 B1 * | 4/2003 | Kim et al. .................... 361/42 |
| 6,628,487 B1 | 9/2003 | Macbeth ...................... 361/42 |
| 6,772,077 B1 * | 8/2004 | Parker et al. ................ 702/76 |
| 6,839,208 B1 * | 1/2005 | Macbeth et al. .............. 361/42 |
| 2004/0042137 A1 * | 3/2004 | Wong et al. .................. 361/42 |

* cited by examiner

*Primary Examiner*—Hal Wachsman
(74) *Attorney, Agent, or Firm*—Cantor Colburn LLP

(57) ABSTRACT

A frequency harmonic identifier for detecting series arcs on a power line includes a frequency analyzer for providing the harmonic content of a sensed current signal and a decision logic for comparing a tested signal to at least one reference signal band. The reference signal band or bands may represent a variety of common loads and if the tested signal does not match any of the sets of reference signal bands, then the logic determines the tested signal to be a series arc signal. The frequency harmonic identifier may be provided within a circuit interrupter and may issue a trip signal if the tested signal is determined to be a series arc signal. Also disclosed is a method for detecting series arcs, and a storage medium having instructions for causing a computer to implement the method.

18 Claims, 5 Drawing Sheets

FFT of Drill Load

FFT of Compressor Load

SERIES ARC DETECTION

BACKGROUND OF INVENTION

This invention is generally related to circuit interruption, and, more particularly, this invention is related to detecting series arcing in an arc fault circuit interrupter.

Arcing is the luminous discharge of electricity across an insulating medium, usually accompanied by the partial volatilization of the electrodes. Arcing faults in ac electrical systems are of two types: parallel arcs and series arcs. In a parallel arcing fault, the arc occurs across two conductors in the branch circuit or extension cords plugged into it, at a site where the insulating media separating the two conductors has been compromised. The arc may occur across the line and neutral conductors or the line and ground conductors, or in the case of reverse polarity where the line voltage is reverse polarized, between the neutral and ground conductors. The current through the parallel arc fault is not limited by the impedance of the load, but rather by the available current from the supply established by the impedance of the conductors and terminals between the source of line voltage and the position of the parallel fault, that is, the conductive members carrying the fault current. Parallel arcing faults can draw considerable current but usually below the pick-up current of the typical circuit breaker. They also tend to be intermittent because of the repulsion forces generated by the current of the arc tends to temporarily separate the conductors and extinguish the arc. Thus, parallel arcs are sometimes also referred to as sputtering arcs.

Series arcing involves an opening or disconnect in a wire or conductor carrying current which allows arcing to occur between one end of the disconnect to the other end. Series arc faults may thus exist when the arc occurs across a break in the line or neutral conductors or at a loose terminal in a branch circuit of a distribution network. The conductors are carrying current to a load derived from the line voltage. The arc could likewise occur as a break or at a loose terminal associated with an extension cord deriving power from line voltage, thereby completing the circuit to the load. Since the current through the series arc fault is limited by the impedance of the load itself, and since the fault is in series with the load, the fault is known as a series arc fault.

FIG. 1 shows how the current in a series arc circuit 110 must bridge or arc across an open path 118. Line and neutral conductors 114, 116 as well as the outer insulation 112, 119 are further shown in FIG. 1. The outer insulation 119 is shown as expanding, prior to rupturing, which may allow the arcing to contact external material which may cause damage.

Prior art methods and apparatus of detecting parallel arcing faults have proven successful. However, lower level arcs in series with a load may be beyond the capabilities of those techniques. Prior art circuit interrupters do not differentiate the frequency content change between switching loads such as drills, hair dryers, and air compressors and those with series arcs. Series arcing faults typically create currents with low root mean square ("RMS") value, which is below the thermal thresholds for such circuit breakers. Even so, such arcs may cause damage or start a fire if they occur near combustible material. There are problems associated with merely increasing the sensitivity of prior techniques. For example, at increased sensitivities, there may be more loads and combinations of loads that can produce false trips.

SUMMARY OF INVENTION

Disclosed herein is a frequency harmonic identifier system for a circuit interrupter, the system including a frequency analyzer for receiving an input signal and providing an output representing a tested signal, a storage area containing at least one reference signal band, and a decision logic, wherein the decision logic compares the tested signal to the at least one reference signal band for determining if the tested signal is a series arc signal or a load.

In other embodiments, a circuit interrupter with series arc detection capability includes a pair of separable contacts for interrupting a circuit, a frequency harmonic identifier system having a frequency analyzer for receiving an input signal and providing an output representing a tested signal, a storage area containing at least one reference signal band, and a decision logic, wherein the decision logic compares the tested signal to the at least one reference signal band for determining if the tested signal is a series arc signal or a load, and wherein a trip signal is sent from the frequency harmonic identifier if the tested signal is determined by the decision logic to be a series arc signal, and wherein the pair of separable contacts are separated after issuance of the trip signal.

In other embodiments, a method for detecting series arcs in a circuit interrupter includes sensing current on a power line and providing a sensed current signal as an input signal to a frequency harmonic identifier, performing a Fast Fourier Transform on the input signal and selecting bands of the Fast Fourier Transform input signal for providing tested signal bands, accessing a storage area storing at least one reference signal band, comparing the tested signal bands to the at least one reference signal band and determining if the input signal is a series arc signal through comparison and, if the input signal is a series arc signal, sending a trip signal.

In other embodiments, a storage medium encoded with machine-readable computer program code for detecting series arcs on a power line, the storage medium including instructions for causing a computer to implement a method including sensing current on a power line and providing a sensed current signal as an input signal to a frequency harmonic identifier, performing a Fast Fourier Transform on the input signal and selecting bands of the Fast Fourier Transform input signal for providing tested signal bands, accessing a storage area storing at least one reference signal band, comparing the tested signal bands to the at least one reference signal band and determining if the input signal is a series arc signal through comparison and, if the input signal is a series arc signal, sending a trip signal.

The above described and other features are exemplified by the following figures and detailed description.

BRIEF DESCRIPTION OF DRAWINGS

Referring now to the FIGS., which are exemplary embodiments, and wherein the like elements are numbered alike.

DETAILED DESCRIPTION

The system disclosed herein detects series arcing by analyzing the frequency content of the sensed current in a power line.

Figure 1:
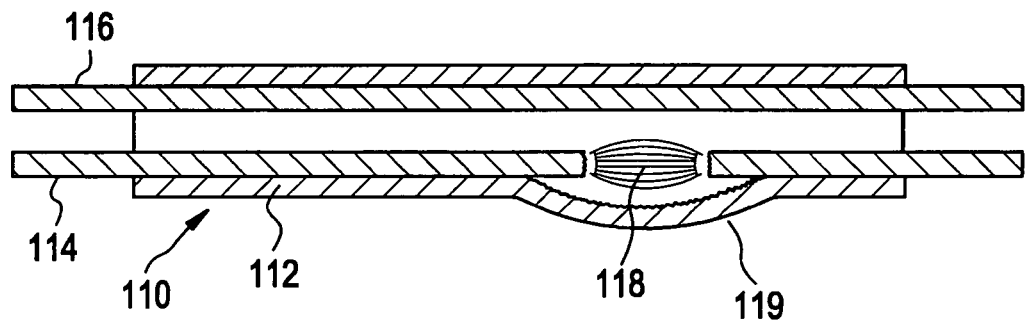
FIG. 1 is a cross-sectional and diagrammatic view of a series arc circuit.
Figure 2:
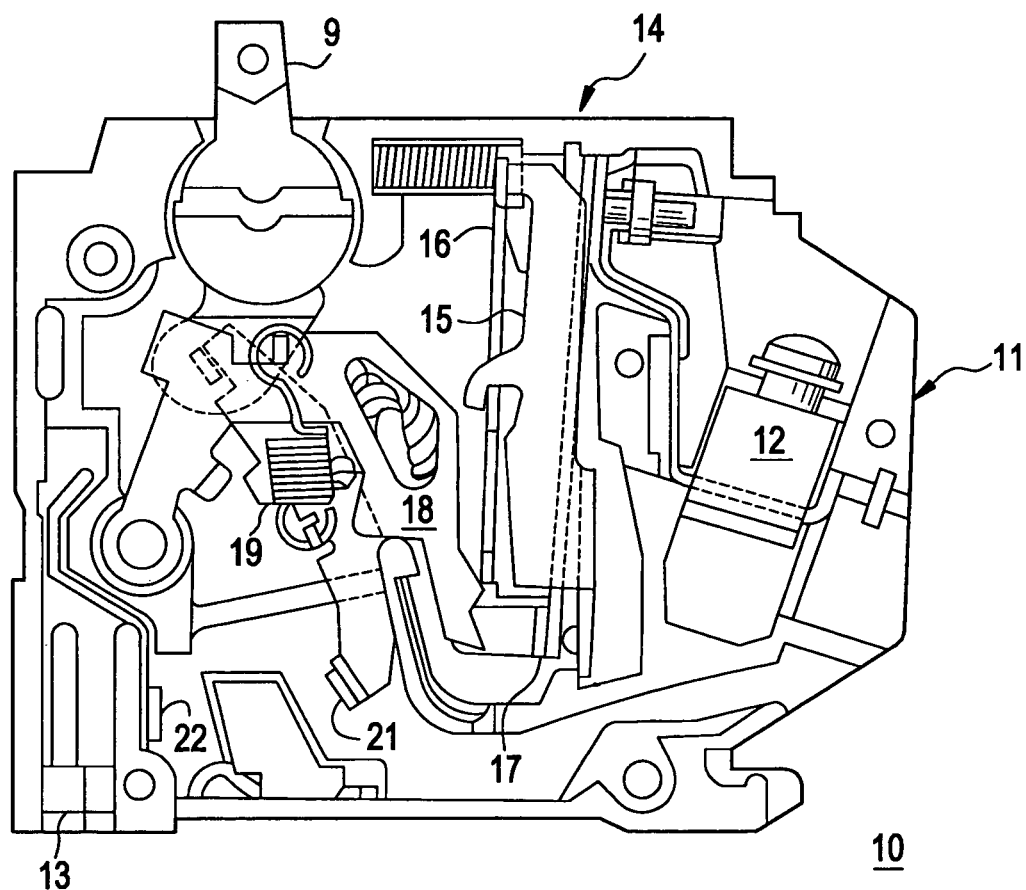
FIG. 2 is a front plan view of a circuit breaker containing a thermal-magnetic trip unit according to the prior art.

A circuit breaker 10 having an externally operated handle 9 is shown in FIG. 2 and may include a molded plastic case 11. The circuit current transfers from the load terminal lug 12, thermal magnetic trip unit 14, fixed and moveable contacts 22, 21 to the line terminal stab 13. The thermal-magnetic trip unit includes a magnet 15 and armature 16 that are arranged for operation upon occurrence of so called "short circuit" and "short time" fault conditions within the protected circuit. "Long time" overcurrent protection may be provided by means of a bimetal 17. The operating cradle 18 may interact with armature 15 to hold the contacts from being separated by the bias provided by the operating spring 19.

Figure 3:
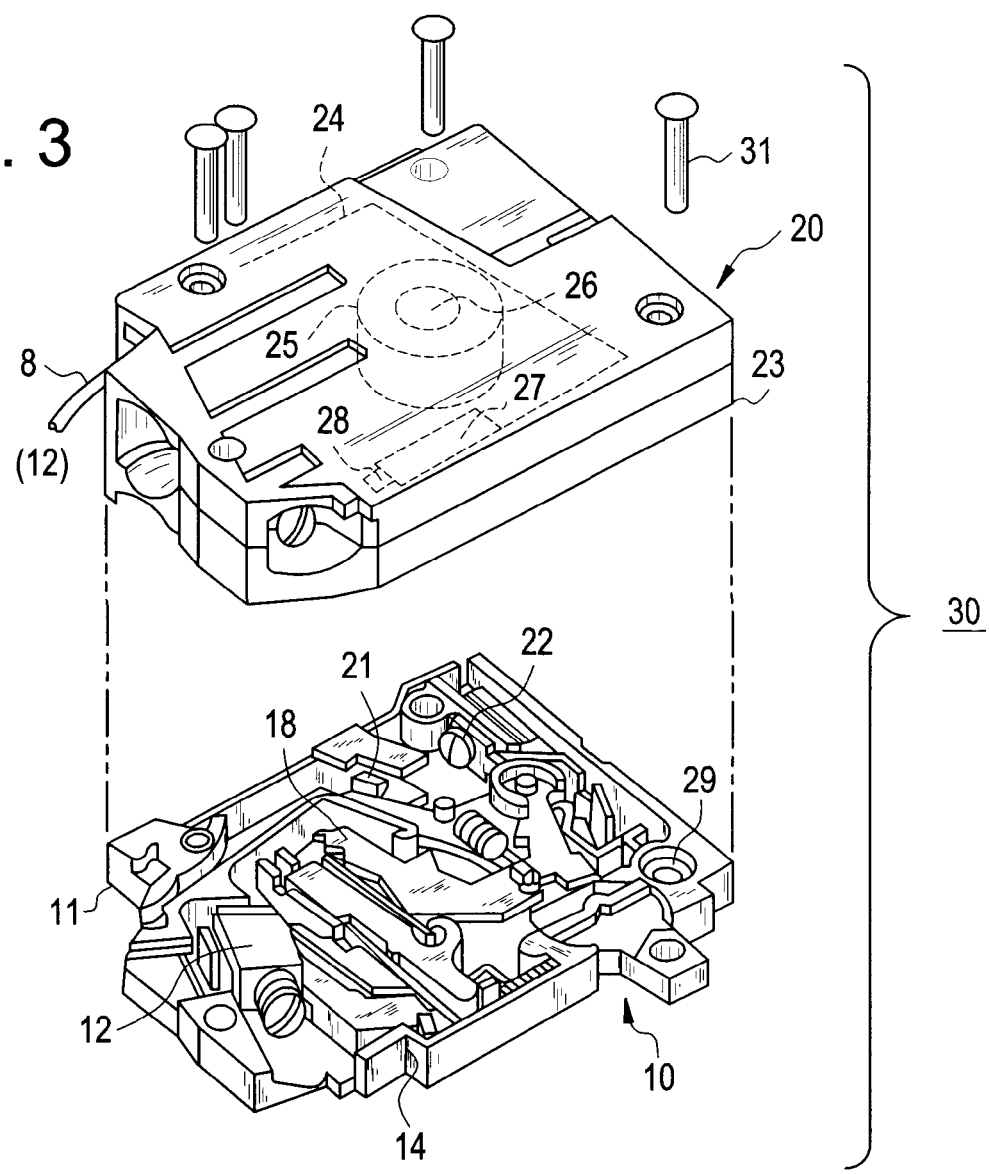
FIG. 3 is a top perspective view of the circuit breaker of FIG. 2 with the arcing fault module of the invention in isometric projection.
Figure 4:
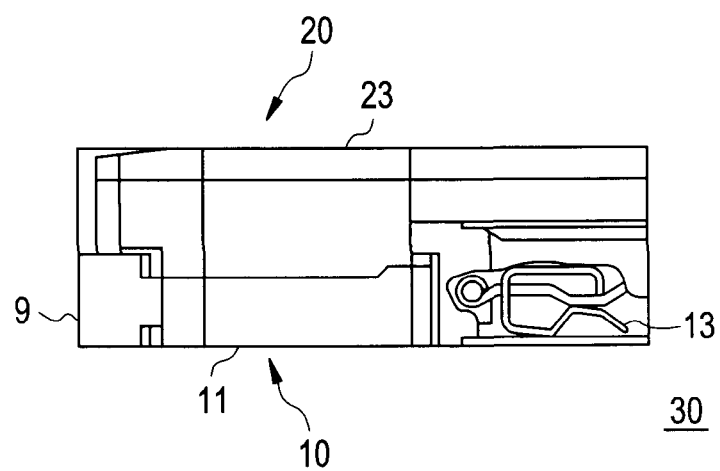
FIG. 4 is a rear plan view of the arcing fault module of FIG. 3 attached to the circuit breaker of FIG. 3.

An exemplary combined arcing fault and circuit breaker unit 30 is shown in FIGS. 3 and 4 and may be formed by attaching a case 23 of an arcing fault module 20 to the case 11 of a circuit breaker 10 by means of rivets 21 and apertures 29, as indicated. Alternatively, the circuit breaker may be made in a unitary case as an arc fault circuit interrupter, which would function in a similar manner as the exemplary combined arcing fault and circuit breaker unit 30. The arcing fault module 20 may include an air core sensing transformer 25. The input current on the load lug 12 may be applied to a wire conductor 8 which passes through an aperture 26 in the air core sensing transformer 25. A printed wire board 24 containing an arcing fault sensing circuit may be used. The trip solenoid 27 may project a trip armature 28 into contact with the circuit breaker operating cradle 18 to separate the circuit breaker contacts 22, 21 independent of the circuit breaker trip unit 14. Electrical connection with the associated electric circuit may be made by means of the line terminal stab 13 and the ON-OFF state of the contacts is controlled by the operating handle 9.

Figure 5:
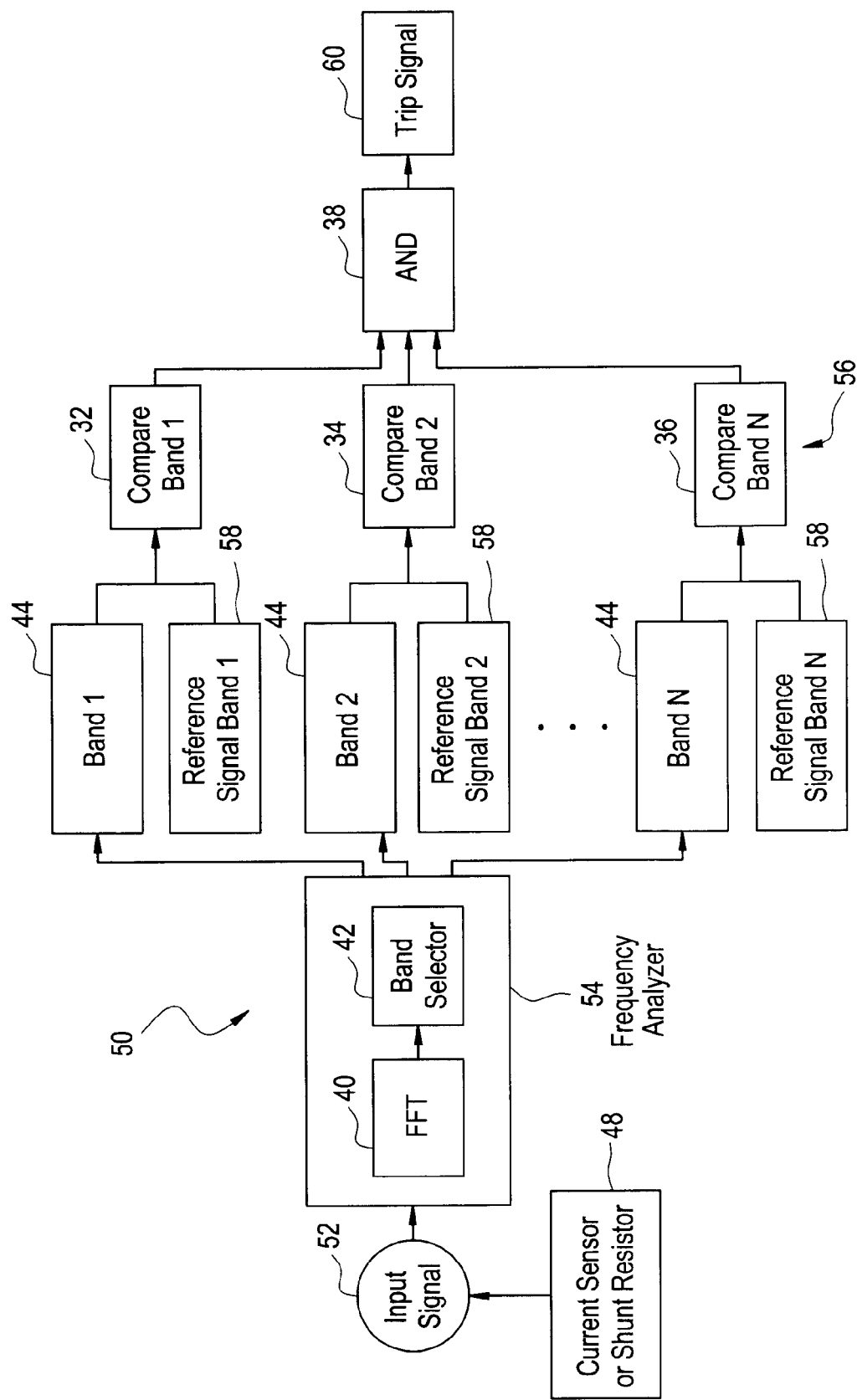
FIG. 5 is a block diagram of a frequency harmonic identifier.

FIG. 5 shows an exemplary block diagram of a frequency harmonic identifier 50 and defines portions of a series arcing fault detection circuit. The components within the series arcing fault detection circuit may be contained within the printed wire board 24 such as shown in FIG. 3. In order to detect series arcs, the current on a power line should be sensed using a current sensor or shunt resistor 48. The current sensor or shunt resistor 48 may be employed in addition to the air core sensing transformer 25 of FIG. 3. The identifier 50 may be implemented in several technologies like microprocessors or Micro-Electro-Mechanical Systems ("MEMS"). As shown in FIG. 5, the sensed current may enter the frequency harmonic identifier 50 as an input signal 52 where the frequency response of the signal 52 will be generated by passing the input signal 52 through a frequency analyzer 54. First the Fast Fourier Transform "FFT" 40 of the input signal 52 is taken, and then the FFT 40 of the input signal 52 is broken up into different bands using a band selector 42 within the frequency analyzer 54. The different bands 44 of the frequency analyzed signal are represented within a decision logic 56 as Band 1, Band 2, . . . , Band N, where N represents the total number of different bands that the band selector 42 divided the FFT 40 of the input signal 52. It would be within the scope of the system for N to be any number suitable for comparison to N bands of a reference signal. The identifier 50 may use the magnitude of the frequency response, from an output of the frequency analyzer 54, in order to determine the highest magnitude harmonics within various frequency bands. Based on the harmonics, the frequency harmonics identifier 50 will determine, using decision logic 56, if the signal 52 is from series arcing or if it is due to a powered load. The identifier 50 can make this determination because series arcing has a different harmonic content than other loads. The decision logic 56 may compare the output of the frequency analyzer 54 with reference signal bands 58. The reference signal bands 58 are represented within the decision logic 56 as Reference Signal Band 1, Reference Signal Band 2, . . . , Reference Signal Band N, where N represents the total number of different bands, which may be the same number N that the band selector 42 divided the FFT 40 of the input signal 52. Since the reference signals bands 58 may be stored in memory, the number N for the band selector 42 may be dictated by the particular number of reference signal bands 58 that are stored. The reference signal bands 58 may be from any number of common loads that might be encountered by the circuit interrupter. While only one set of reference signal bands 58 is shown, it should be understood that any number of sets of reference signal bands, such as those representing alternate loads, could be included for similar comparisons to the frequency analyzed input signal. It should be further noted that what may be stored in memory need not be an exact reference signal, but instead a range that a reference signal will fall in.

As shown in the decision logic 56, each of the bands 44 from the band selector 42 is compared to the stored reference signal bands 58. Band 1 from the input signal 52 is compared to the stored reference signal band 1 as demonstrated by block 32. Similarly, Band 2 from the input signal 52 is compared to the stored reference signal band 2 as demonstrated by block 34 and Band N from the input signal 52 is compared to the stored reference signal band N as demonstrated by block 36. Any number of comparisons may be made in between, depending on the number N of bands 44 and 58.

The bands 44 and the reference signal bands 58 will either match, such as a match within a certain range, or will not match. After all of the comparisons are made, such as in blocks 32, 34, 36, the results may be passed through an AND gate 38. In one of the embodiments, if all of the comparisons match, then the decision logic 56 determines that the input signal 52 is actually a common load, and then the circuit interrupt decision made at block 60 would be to not interrupt the circuit. If, however, the decision logic 56 determines, such as through one of the comparison blocks 32, 34, 36, that one of the bands 44 is not similar to one of the respective reference signal bands 58, then the circuit interrupt decision made at block 60 would be to interrupt the circuit and a trip signal may be sent to the trip solenoid 27 to project the trip armature 28 into contact with the circuit breaker operating cradle 18 to separate the circuit breaker contacts 22, 21. Since there may be more than one set of reference signal bands 58 stored for use by the decision logic 56, a similar set of comparisons may be made comparing the set of bands 44 to each of the different sets of reference signal bands 58. That is, even if the bands 44 do not match the bands of one set of reference signal bands 58, the bands 44 may match a different set of reference signal bands 58, in which case a trip signal would not be sent since the decision logic 56 would determine that the input signal 52 is actually a common load.

Thus, the input signal 52 is compared to the ranges that a particular reference signal will fall in. The highest magnitude at a particular frequency in each band 44 of the FFT input signal 40 is compared to the corresponding band 58 of a reference signal. It should be noted that the whole of the reference signal need not be compared, just the range where the reference signal will be present at a particular frequency. If an input signal 52 is outside a reference signal's range, then that signal is not in that reference signal's category.

In the plots shown in FIGS. 6–9, the Fast Fourier Transforms ("FFT") of several loads are shown in order to compare the difference in each signal's frequency content. The variation in frequency content is what the identifier 50, within decision logic 56, will use to distinguish between series arcing and the current drawn by different loads. The FFT plots show that each load produces a different harmonic content. By classifying common loads for reference signal bands 58, the frequency harmonic identifier 50 may be designed to recognize series arcing versus nuisance loads.

Figure 6:
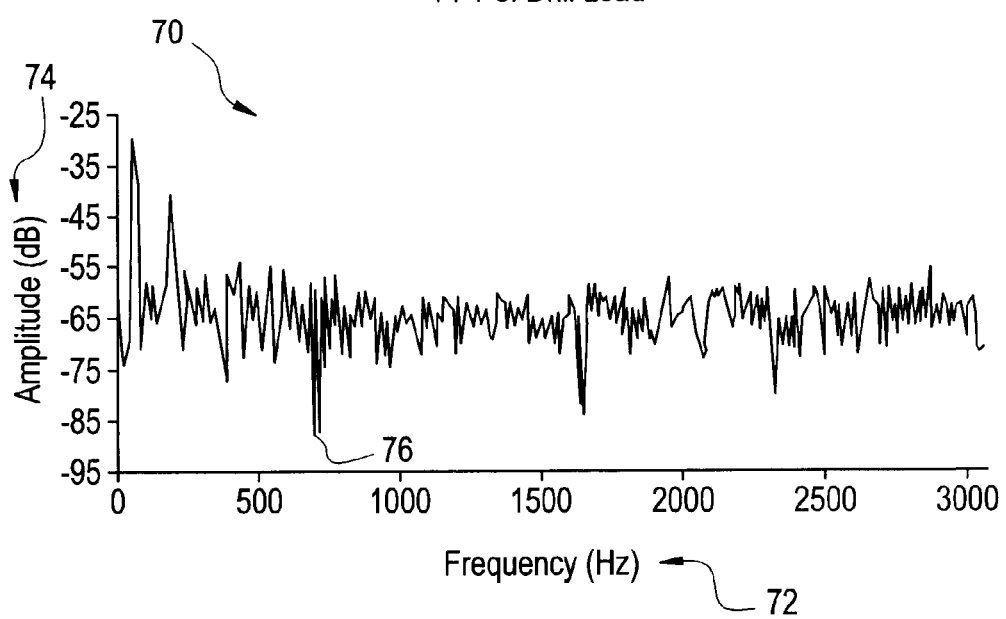
FIG. 6 is an FFT plot of a drill load.
Figure 7:
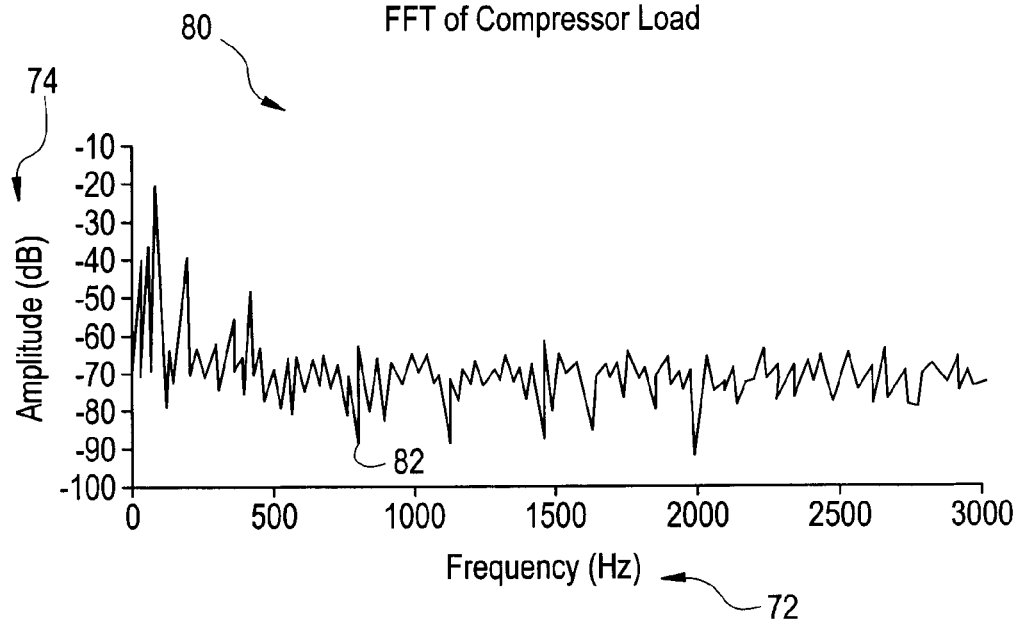
FIG. 7 is an FFT plot of a compressor load.
Figure 8:
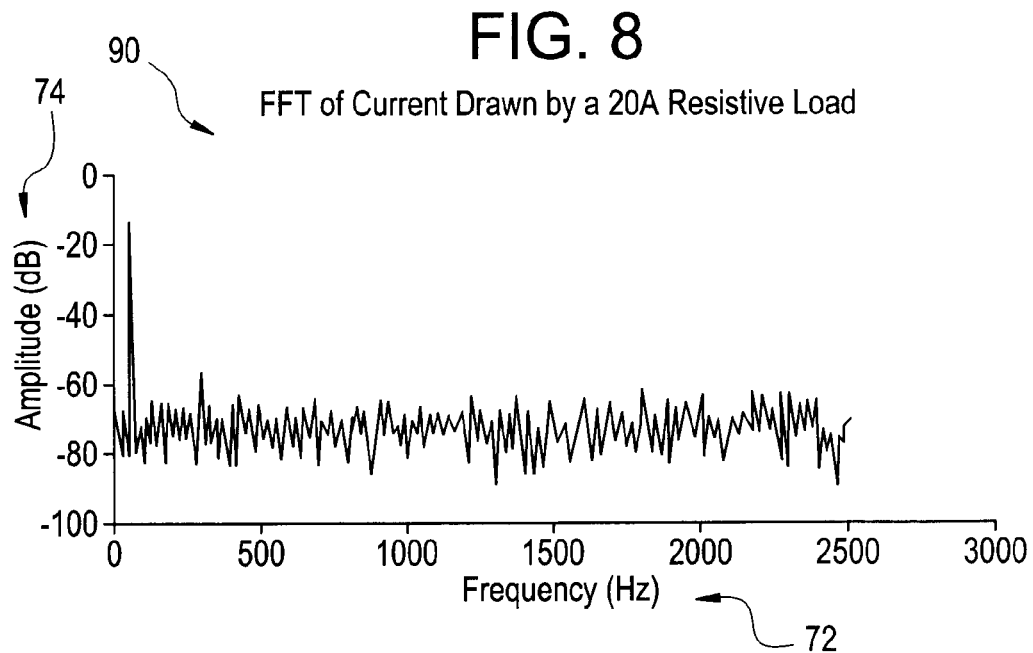
FIG. 8 is an FFT plot of current drawn by a 20 A resistive load.

It should be understood that there may be any number of sets of reference signal bands 58, including more than what is shown in FIGS. 6–8, and that these reference signal bands 58 may come from a variety of loads including those not specifically disclosed herein. In any case, these reference signal bands 58 should indicate loads which do not reflect the same harmonic content as series arcing.

As shown in FIG. 6, an exemplary FFT plot 70 of a drill load is shown. The FFT plot 70 plots the frequency in Hz 72 versus amplitude in dB 74. The FFT plot 70 may include some identifiable frequency components, such as, but not limited to component 76, which may otherwise be mistaken for series arcing, but since it may be classified as a reference signal band 58, an input signal 52 having the same or similar frequency components as shown by plot 70 will result in a negative circuit interrupt decision, that is, the circuit will not be interrupted.

As shown in FIG. 7, an exemplary FFT plot 80 of a compressor load is shown. The FFT plot 80 plots the frequency in Hz 72 versus amplitude in dB 74. The FFT plot 80 may include some identifiable frequency components, such as, but not limited to component 82, which may otherwise be mistaken for series arcing, but since it is classified as a reference signal band 58, an input signal 52 having the same or similar frequency components as shown by plot 80 will result in a negative circuit interrupt decision, that is, the circuit will not be interrupted.

As shown in FIG. 8, an exemplary FFT plot 90 of current drawn by a 20 A resistive load is shown. The FFT plot 90 plots the frequency in Hz 72 versus amplitude in dB 74. The FFT plot 90 may include some identifiable frequency components, such as, but not limited to component 92, which may otherwise be mistaken for series arcing, but since it is classified as a reference signal band 58, an input signal 52 having the same or similar frequency components as shown by plot 90 will result in a negative circuit interrupt decision, that is, the circuit will not be interrupted.

Figure 9:
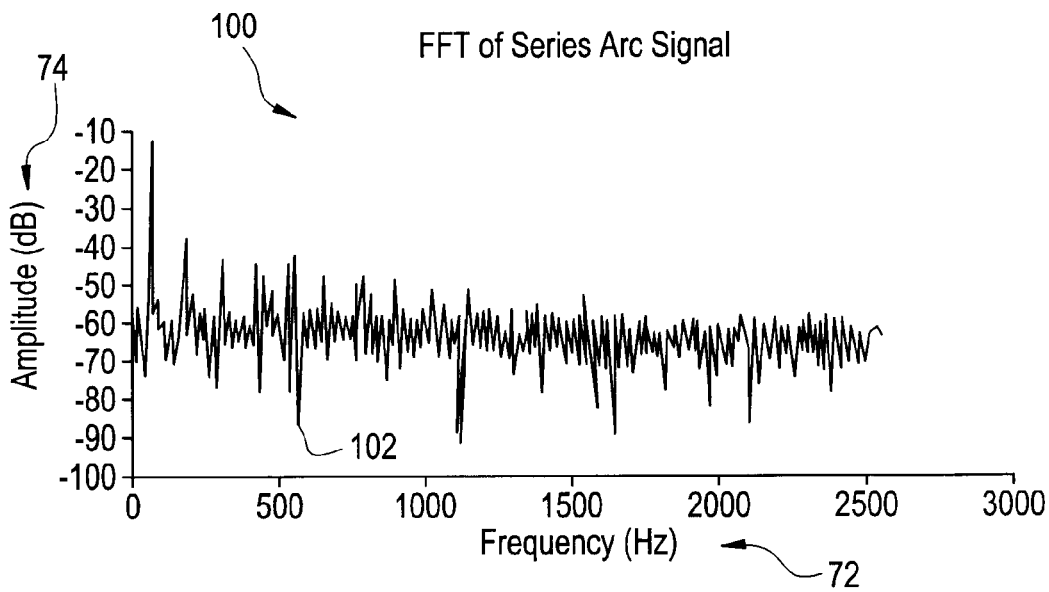
FIG. 9 is an FFT plot of a series arc signal.

As shown in FIG. 9, an exemplary FFT plot 100 of an exemplary series arc signal is shown. The FFT plot 100 plots the frequency in Hz 72 versus amplitude in dB 74. The FFT plot 100 may include some identifiable frequency components, such as, but not limited to component 102, which may be indicative of series arcing. Moreover, when this signal, from input signal 52 is compared to the library of reference signal bands 58, none of the reference signal bands 58 contain the same or similar component 102, as well as other components, not specifically enumerated within the FFT plot 100, which distinguishes the signal 52 as a series arc signal rather than a load represented by any one of the reference signal bands 58. Once it is determined by the decision logic 56 that the signal 52 is a series arc signal rather than a representative load stored as a set of reference signal bands 58, a positive circuit interrupt decision is made at block 60, that is, the circuit will be interrupted.

In alternate embodiments, it may be within the scope of this system to provide exemplary series arc signals within the reference signals 58 such that when the tested signal 52 is compared to the referenced series arc signal, the same positive circuit interrupt decision is made. In such a case, the gate 38 may be an OR gate since any determination that an input signal 52 matches a set of reference signal bands 58 which represent a series arc signal, a trip signal should be sent.

Thus, a method for detecting series arcs on a power line includes sensing current on a power line and providing a sensed current signal as an input signal 52 to a frequency harmonic identifier 50, performing a Fast Fourier Transform 40 on the input signal 52 for providing a tested signal, accessing a storage area storing at least one reference signal band 58, comparing at least one band of the tested signal to at least one band of the at least one reference signal band 58 and determining if the tested signal 52 is a series arc signal through comparison and, if the tested signal is a series arc signal, sending a trip signal.

A software application, or other storage medium encoded with machine-readable computer program code including instructions for causing a computer to implement a method, may be utilized that will read a sampled load signal 52 and perform a FFT on the signal 52, via the frequency analyzer 54. With the FFT output, a technical contribution for the disclosed application and system is that the identifier 50 can determine the frequencies associated with the highest order magnitudes and such information may be utilized within decision logic 56 as described above.

This system can be embodied in the form of computer-implemented processes and apparatuses for practicing those processes. This system can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. This system can also be embodied in the form of computer program code, for example, whether stored in a storage medium, loaded into and/or executed by a computer, or transmitted over some transmission medium, such as over electrical wiring or cabling, through fiber optics, or via electromagnetic radiation or other wireless means of transmission and communication, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A frequency harmonic identifier system for a circuit interrupter, the system comprising:
    a frequency analyzer for receiving an input signal and providing an output representing a tested signal;
    a storage area containing at least one reference signal band; and,
    a decision logic, wherein the decision logic compares the harmonic content of selected bands of the tested signal to harmonic content of each of the at least one reference signal band for determining if the tested signal is a series arc signal or a load thereby providing for frequency harmonic identification of the series arc signal.

2. The system of claim 1 wherein the frequency analyzer provides a Fast Fourier Transform of the input signal and a band selector for selecting bands of the Fast Fourier Transform of the input signal for comparing to the at least one reference signal band.

3. The system of claim 1 wherein the input signal is a sensed current on a power line.

4. The system of claim 1 wherein the storage area contains a plurality of sets of reference signal bands.

5. The system of claim 4 wherein the plurality of sets of reference signal bands are classified according to highest magnitude harmonics within frequency bands.

6. The system of claim 1 wherein the at least one reference signal band represents at least one common load.

7. The system of claim 1 wherein a circuit interrupt decision is made based on the decision logic comparison, wherein, if the tested signal is determined to be a series arc signal by the decision logic, then a trip signal is provided.

8. A circuit interrupter with series arc detection capability, the circuit interrupter comprising:
    a pair of separable contacts for interrupting a circuit;
    a frequency harmonic identifier system having:
    a frequency analyzer for receiving an input signal and providing an output representing a tested signal;
    a storage area containing at least one reference signal band; and,
    a decision logic, wherein the decision logic compares harmonic content of the tested signal to harmonic content of each of the at least one reference signal band for determining if the tested signal is a series arc signal or a load, thereby providing for frequency harmonic identification of the series arc signal;
    wherein a trip signal is provided if the tested signal is determined by the decision logic to be a series arc signal, and wherein the pair of separable contacts are separated after issuance of the trip signal.

9. The circuit interrupter of claim 8 further comprising at least one of a current sensor and a shunt resistor for sensing current on the circuit for use as the input signal.

10. The circuit interrupter of claim 8 wherein the frequency harmonic identifier system is provided within a microprocessor within the circuit interrupter.

11. The circuit interrupter of claim 8 wherein the storage area is a memory accessible by the decision logic.

12. The circuit interrupter of claim 8 wherein the frequency analyzer provides a Fast Fourier Transform of the input signal and a band selector for selecting bands of the Fast Fourier Transform input signal for comparing to the at least one reference signal band.

13. The circuit interrupter of claim 8 wherein the storage area contains a plurality of sets of reference signal bands classified according to highest magnitude harmonics within frequency bands and wherein at least one of the plurality sets of reference signal bands represents at least one common load.

14. A method for detecting series arcs in a circuit interrupter, the method comprising:
    sensing current on a power line and providing a sensed current signal as an input signal to a frequency harmonic identifier;
    performing a Fast Fourier Transform on the input signal and selecting bands of the Fast Fourier Transform of the input signal for providing tested signal bands;
    accessing a storage area storing at least one reference signal band;
    comparing harmonic content of the tested signal bands to harmonic content of each of the at least one reference signal band and determining if the input signal is a series arc signal through the comparison; and,
    if the input signal is a series arc signal, sending a trip signal.

15. The method of claim 14 wherein the at least one reference signal band is a plurality of sets of reference signal bands representing a plurality of common loads.

16. The method of claim 15 wherein determining if the input signal is a series arc signal comprises comparing harmonic content of the tested signal bands to harmonic content of each of the plurality of sets of reference signal bands.

17. A storage medium encoded with machine-readable computer program code executable by computer for detecting series arcs on a power line, the storage medium including instructions for execution by the computer to implement a method comprising:
    sensing current on a power line and providing a sensed current signal as an input signal to a frequency harmonic identifier;
    performing a Fast Fourier Transform on the input signal and selecting bands of the Fast Fourier Transform of the input signal for providing tested signal bands;
    accessing a storage area storing at least one reference signal band;
    comparing harmonic content of the tested signal bands to harmonic content of the at least one reference signal band and determining if the input signals is a series arc signal through the comparison; and,
    if the input signal is a series arc signal, sending a trip signal.

18. The storage medium of claim 17 further comprising instructions for causing the computer to implement:
    comparing harmonic content of the tested signal bands to harmonic content of each of the at least one reference signal band.

* * * * *

UNITED STATES PATENT AND TRADEMARK OFFICE
CERTIFICATE OF CORRECTION

PATENT NO. : 7,062,388 B2  Page 1 of 1
APPLICATION NO. : 10/708686
DATED : June 13, 2006
INVENTOR(S) : Rivers, Jr. et al.

It is certified that error appears in the above-identified patent and that said Letters Patent is hereby corrected as shown below:

Column 7:
Line 17, after "compares" delete --the--

Column 8:
Line 7, after "Transform" insert -- of the--

Signed and Sealed this

Twelfth Day of December, 2006

JON W. DUDAS
*Director of the United States Patent and Trademark Office*